United States Patent [19]

Hsu et al.

[11] Patent Number: 5,285,144
[45] Date of Patent: Feb. 8, 1994

[54] GENERATION OF MULTI-PHASE MULTIPLE-ORDER HARMONICS OF A FUNDAMENTAL FREQUENCY SOURCE WITH ADJUSTABLE PHASE ANGLE CAPABILITY

[75] Inventors: John S. Hsu, Round Rock; Amr M. A. Amin, Austin, both of Tex.

[73] Assignee: Board of Regents, The University of Texas System, Austin, Tex.

[21] Appl. No.: 574,397

[22] Filed: Aug. 27, 1990

Related U.S. Application Data

[63] Continuation of Ser. No. 241,025, Sep. 2, 1988, abandoned.

[51] Int. Cl.⁵ .............................................. H02P 7/00
[52] U.S. Cl. ...................................... 318/807; 318/809
[58] Field of Search ........ 318/254, 439, 138, 799–812, 318/738

[56] References Cited

U.S. PATENT DOCUMENTS

| | | | |
|---|---|---|---|
| 2,231,607 | 2/1941 | Westendorp | 318/738 |
| 3,231,805 | 1/1966 | Shibata | 318/738 |
| 3,546,551 | 12/1978 | Risberg et al. | 318/805 |
| 4,044,284 | 8/1977 | Plunkett et al. | 318/803 |
| 4,394,610 | 7/1983 | Dolland | 318/809 |
| 4,743,815 | 5/1988 | Gee et al. | 318/254 |
| 4,970,445 | 11/1990 | Kimura et al. | 318/254 |
| 5,012,167 | 4/1991 | Hendricks | 318/254 |
| 5,019,766 | 5/1991 | Hsu et al. | 318/807 |

Primary Examiner—Jonathan Wysocki
Attorney, Agent, or Firm—Arnold, White & Durkee

[57] ABSTRACT

Improved techniques and circuit arrangements are provided for generating gating signals for firing the switching devices of an inverter circuit or like power electronics generator to generate harmonics of a fundamental frequency source and for providing an adjustable phase offset between the harmonic and the fundamental signals. According to a line-frequency signal modification method, a set of line-frequency sine wave signals disposed at equidistant phase angles are generated from a multi-phase fundamental input voltage. Firing pulses are produced from the line-frequency signals by accurately detecting the points of zero-crossings for the signals and subsequently detecting the overlapping segments of similar polarity between successive line-frequency signals. Two different schemes for conveniently generating the required line-frequency sine wave signals are present. According to a digital technique, a series of logic counters are used to generate the required M-phase, Nth-order harmonic gate timing signals. A first counter is used to generate a train of a predefined number of equidistant pulses corresponding to N and M, per fundamental line frequency cycle. A second counter is provided for generating a phase-delayed signal for adjusting the phase angle of the gate timing signals with respect to the line-frequency signal. A third counter is provided for distributing the train of pulses among the plurality of switches of the harmonic generator. The arrangement is such that the train of pulses generated by the first counter is locked to the phase-delayed signal generated by the second counter.

10 Claims, 10 Drawing Sheets

GENERATION OF MULTI-PHASE MULTIPLE-ORDER HARMONICS OF A FUNDAMENTAL FREQUENCY SOURCE WITH ADJUSTABLE PHASE ANGLE CAPABILITY

This is a continuation of copending application Ser. No. 07/241,025 filed on Sep. 2, 1988 now abandoned.

BACKGROUND OF THE INVENTION

1. Field of the Invention

This invention relates generally to techniques for improving the performance of polyphase alternating current (AC) machines by injection of harmonic frequencies into the excitation current. More particularly, this invention relates to improved techniques for generating harmonics of a fundamental frequency source and providing an adjustable phase offset between the harmonic and the fundamental frequencies.

2. Description of Related Art

Polyphase machines of both the induction and synchronous type are typically operated from a single frequency source and have armature windings distributed in slots in such a way as to approximate a constant-amplitude, sinusoidally-distributed flux wave traveling around the rotor air-gap at synchronous speed. Ideally, the flux wave so generated produces a steady electromagnetic torque having a maximum value dependent upon the air-gap flux per pole and the current-carrying capacity of the armature winding. Because the maximum flux density of the air-gap flux wave is limited by the saturation flux density of the material (typically magnetic steel) existing in the flux path, the air-gap flux per pole produced by the flux wave is also correspondingly limited.

Using the flux-per-pole of a sinusoidal flux wave as a reference and maintaining a constant peak flux density, the flux per pole can be increased by the addition of odd harmonics of appropriate amplitude to the fundamental wave. The increased flux reaches a maximum value as the combination of the fundamental frequency and odd harmonics added thereto approaches a square wave. The combination, for instance, of a third harmonic wave and the fundamental wave can produce up to a 23% increase in the flux per pole relative to the sinusoidal reference, provided the amplitude of the waves are appropriately matched. The increase in air-gap flux per pole resulting from the added space harmonics can be used to increase the power output of a polyphase machine without exceeding thermal dissipation limits. In particular, a significant increase in the output power and performance of an induction motor can be achieved with the addition of third-harmonic flux. The application of third-harmonic excitation is also advantageous in that core losses and excitation currents can be reduced (when the magnetic path is saturated) in polyphase transformers and rotating machines; the reduced core losses directly contribute to increased efficiency and rating.

An exemplary method for improving the performance of polyphase machines by using the combination of a fundamental frequency and an odd harmonic thereof is described in copending U.S. patent application Ser. No. 888,818, filed Jul. 22, 1986, entitled "Method And Apparatus For Improving Performance Of AC Machines", which is also owned by the assignee of the present invention. As described therein, the excitation of odd harmonics serves to improve performance of an AC machine in two ways: (a) the flux distribution introduced by the added harmonic excitation produces increased fundamental distribution of flux densities along the magnetic path so as to improve the magnetic loading of the material, and (b) the added harmonic flux distribution yields increased output torque if the machine is provided with conductors or coils responsive to the armature harmonic frequencies or if the rotor poles produce permeance waves responsive to the harmonic frequencies. This concept of flux modulation by third-harmonic current injection is becoming increasingly common as a means for enhancing the performance of electric power apparatus.

A critical aspect of implementing harmonic injection schemes is of course the provision of a reliable harmonic frequency source. It is also important that such a harmonic generator be capable of providing an adjustable phase angle for the harmonic voltage with reference to the fundamental voltage in order that an optimum flux pattern be obtained and the harmonic phase angle be locked to the desired phase angle. The generation of odd harmonic frequencies, particularly the third harmonic, is, however, not restricted to applications employing the flux modulation technique. Generators of this type are also essential in a variety of other applications such as those using harmonic distortion for increasing the output voltage of polyphase PWM inverters, multiplex converters, and AC-to-DC converters. For instance, in AC/DC controlled converter applications, the rectangular supply current can be modified by addition of a third harmonic current of appropriate amplitude and phase in order to reduce undesirable harmonic content in the supply current.

A variety of approaches are presently used for generating harmonic components along with the fundamental wave component. Different methods, ranging from the use of separate coils for fundamental excitation and for each odd harmonic excitation to the use of a common set of delta-connected windings actuated through a multiphase inverter, are employed. U.S. Pat. No. 3,970,914 to Salzman et al.("Salzman"), for instance, describes the production of a third-harmonic component together with a fundamental component through the use of inverters. U.S. Pat. No. 4,264,854 to Hawtree ("Hawtree") discloses the use of a plurality of similar digital counters in order to produce multiphase signals and to regulate phase displacement between armature windings. Another example is the technique proposed by Power Liou ("Theoretical And Experimental Study Of Polyphase Induction Motors With Added Third Harmonic Excitation", thesis for M.S.E.E., the University of Texas at Austin, December 1985; "Liou") which is based on generating a single-phase third-harmonic signal by using a triac circuit. Other schemes include those based on phase-shifting a line-frequency signal to produce third-harmonic multiphase gate timing signals which are fed to the solid-state switches of an inverter circuit, using synchronous generators with high-power converters and oscillator-amplifier systems with low-power converters, and using the DC ripples of a six-pulse converter as a basis for generating desired harmonics. It is also possible to use a phase-locked oscillation control scheme together with an appropriate logic system to control the phase angle and frequency relationship between the fundamental frequency input and the harmonic frequency output.

A common problem with conventional third-harmonic generation schemes is the typically high cost and circuit complexity of the harmonic generator required to attain desired performance goals. In addition, conventional harmonic generators are incapable of generating independent third-harmonic gating signals which have the harmonic phase angle conveniently adjustable relative to the fundamental wave. Another problem is that the third-harmonic component is typically produced as a distorted version of the fundamental sine wave (see, for e.g., the Salzman disclosure). Existing digital techniques also suffer from the problem of error accumulation over the different harmonic cycles (see, for e.g., the Hawtree disclosure) and generally require complicated harmonic generation and filtering circuits (see, for e.g., the Liou disclosure). Closed-loop schemes are particularly costly because of the complex circuitry involved in using a closed-loop adjustment to minimize the errors between the desired harmonics and the actual output harmonics.

There accordingly exists a need for uncomplicated, low-cost, and high-performance generation of odd-harmonic gating signals having conveniently adjustable phase angles with respect to the fundamental frequency wave.

SUMMARY OF THE INVENTION

It is a primary object of this invention to provide an improved and efficient scheme for generation of harmonic gating signals having an adjustable phase offset between the harmonic signals and the fundamental wave.

It is an important object of this invention to provide simple and low-cost circuit arrangements for firing the switching devices of an inverter or like power electronics generator to generate a harmonic of a fundamental frequency source and for providing an adjustable phase offset between the harmonic and the fundamental signals.

A related object of this invention is to provide a scheme and circuit arrangements of the above type which is capable of producing independent third-harmonic gating signals without need for complicated generation and filtering stages.

Another important object of this invention is to provide a harmonic generation arrangement capable of controllably generating M-phase, Nth-odd harmonic signals in which the adjustment of phase shift is tied to the fundamental frequency signal.

These and other objects are accomplished, according to a preferred embodiment of this invention, by means of a "line-frequency signal modification" method based on the generation of a set of line-frequency sine wave signals disposed at equidistant phase angles. Converter means are provided for transforming generated signals into square waves of the line frequency. Logic means are provided for producing firing pulses from the zero-crossings or overlaps between successive line-frequency signals. The capability of phase adjustment between the fundamental and the harmonic wave signals is provided by means of either a rotating transformer scheme or an adjustable phase shifter scheme.

According to the rotating transformer scheme, the rotor or stator of the AC machine is energized with the line frequency power to produce a rotating field and a set of line-frequency signals is obtained from opposite stator coils; the derived signals have a phase relationship corresponding to the physical location of the coils around the machine peripheral. The relative position between the stator and the rotor can be conveniently adjusted in order to adjust the phase angle of the generated signals as a group relative to the line voltage.

According to the adjustable phase shifter scheme, a group of RLC phase-shifting components is linked to the output of an adjustable phase shifter and produces a set of fundamental frequency signals at an equidistant phase angle. The adjustable shifter itself is adapted to produce the phase shift of the generated signals from the line voltage signal.

An alternative embodiment of this invention is based on a "digital" method and utilizes a plurality of binary counters to generate phase-adjustable, odd harmonics. A first counter means accepts data representing the desired phase order at a parallel load input which is triggered by an edge of the fundamental source signal. The counter also includes a "zero" output for producing a phase-delayed pulse synchronized to the edge of the fundamental source signal. A second counter means is provided for generating a train of equidistant pulses at a defined multiple of the harmonic frequency corresponding to the number of switching devices provided in the inverter or like power electronics generator being used for generating harmonics. A phase-delayed pulse signal from the first counter means presets the second counter means so as to lock the pulse train to the phase angle specified by the first counter means. A third counter means is provided for distributing the train of pulses among the plurality of switches of the inverter to generate the desired harmonic signals.

BRIEF DESCRIPTION OF THE DRAWINGS

Other objects and advantages of the invention will become apparent upon reading the following detailed description and upon reference to the drawings in which.

Figure 1:
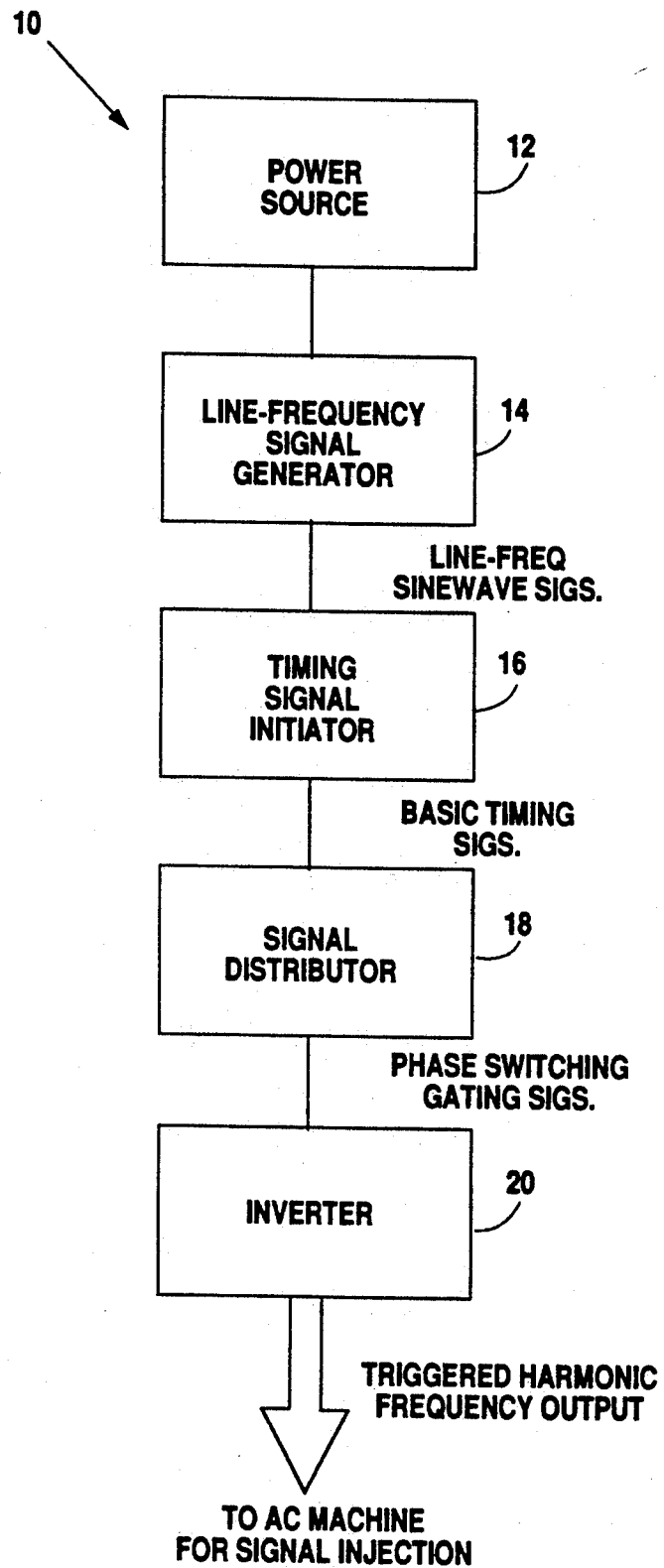
FIG. 1 is a simplified block diagram of a phase-adjustable harmonic generation scheme, according to a preferred embodiment of this invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Referring now to FIG. 1, there is shown a simplified block diagram of a scheme for generation of harmonics having a phase angle tied to a fundamental wave according to a preferred embodiment of this invention. As shown therein, the harmonic generation scheme 10 includes a power source 12 for providing the fundamental input voltage, which is typically a multi-phase, sinusoidal waveform. A set of line-frequency sine wave signals at an equidistant phase angle is then derived from the fundamental voltage by means of a signal generator 14. According to this invention, two different schemes are presented for generating the required set of line-frequency sine wave signals:

1) A rotating transformer scheme in which the rotor or stator of an electric machine is energized with the line-frequency power to produce a rotating field. A set of line-frequency signals is then obtained from opposite stator or rotor coils with a phase relationship corresponding to the physical location of these coils around the machine peripheral. Accordingly, the phase angle of the signals relative to the line voltage as a group is adjustable by changing the relative position between the stator and the rotor.

2) An R-L-C (resistor-inductor-capacitor) phase shifter scheme in which R, L, C phase-shifting components are used to generate a set of fundamental frequency signals at an equidistant phase angle. A center-tapped transformer-based adjustable phase shifter to produce the desired degree of phase shift is used in the fundamental frequency signals. Specific details on the operation of each of these schemes will be discussed below.

In FIG. 1 the sine wave signals generated at the line-frequency by the signal generator 14 are fed to a timing signal initiator 16 which generates the Nth-harmonic, M-phase timing signals by means of line-frequency phasors which are constructed by addition of the basic two- or three-phase vectors in proper proportions as described below. In order to produce the phase-switching gating signals which are finally used to generate the desired harmonic frequency output, it is necessary that the zero-crossing and/or voltage crossing points of the basic timing signal voltages be accurately identified and grouped according to their relationship with the signal voltages. In order to accomplish this, the signal generator 16 uses a zero-crossing detector to transform the line-frequency sine wave signals into corresponding line-frequency square waves. The polarity of the sine waves can then be detected with increased accuracy because the value around the zero-crossing points can be better detected with square waves which have a discrete step at the zero-crossing point.

The basic timing signals produced by the signal initiator 16 are subsequently fed to a signal distributor 18 which essentially functions to distribute the phase-switching signals among the plurality of solid-state switches of an inverter 20 constituting the power circuit capable of generating the desired M-phase, Nth-harmonic output. The harmonic output of the inverter 20 is available for signal injection purposes to increase the performance of AC machines. The circuit composition and operation of inverter circuits or like power electronics generator circuits capable of generating harmonic-frequency output on the basis of appropriate phase-switching gating signals fed to corresponding input switches is well known in the art and, accordingly, will not be described herein. The present invention focuses upon a novel scheme for generating gating signals which are used for triggering the solid-state switches of conventional inverters to produce the desired harmonic-frequency output and is independent of the particular type of inverter circuit being used.

Figure 2A:
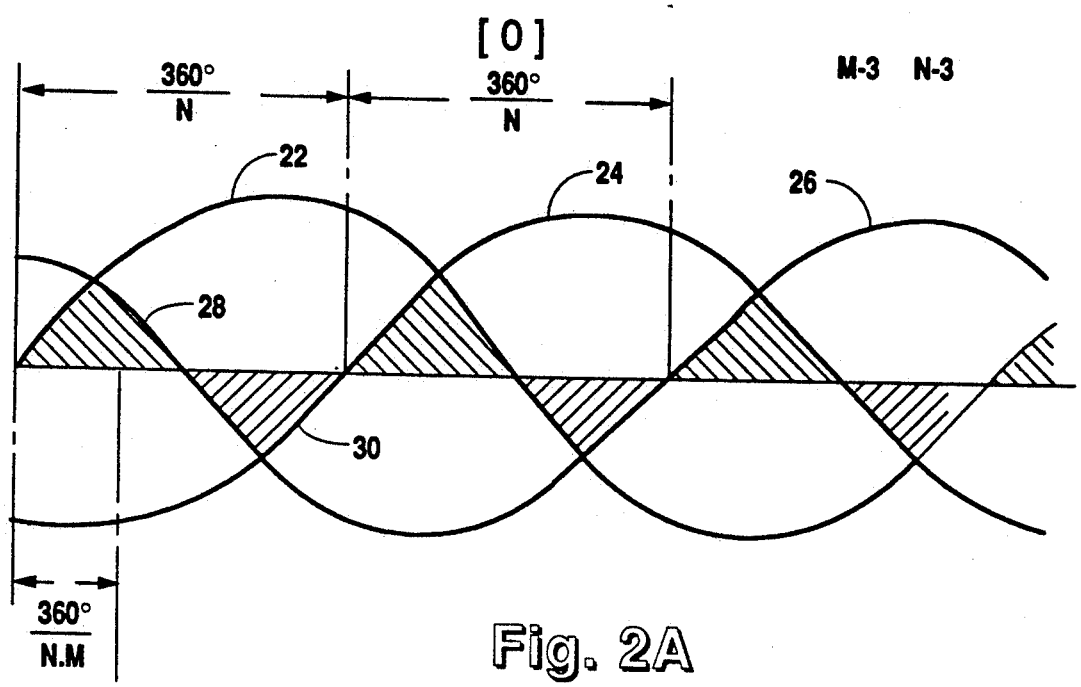
FIGS. 2A and 2B are diagrammatic representations of harmonic signals derived from sine waves at the fundamental or line frequency.

The generation of gating signals for producing harmonic signals having the desired order and phase from fundamental timing signals will now be described in detail below. Referring first to FIG. 2A, there is shown a diagrammatic representation of harmonic signals derived from a multiphase sinusoidal waveform at the fundamental or line-frequency. FIG. 2A shows a group of three line-frequency sine waves 22, 24, 26 having a phase angle which is inversely proportional to the harmonic order of the waves. The phase angle between line-signals can be expressed mathematically as:

$$\phi = \frac{360°}{N} \qquad (1)$$

where N is an odd integer representing the harmonic order.

The three line-frequency sine waves 22, 24, and 26 in FIG. 2A are disposed at an equidistant phase angle relative to each other, the phase angle $\phi$ being based on equation (1). The shaded areas 28 on the positive or upper region of the amplitude reference line correspond to the situation at a given instant of time where two of the three overlapping segments of the three sine waves are positive during the time frame corresponding to the positive cycle of any of the three sine waves. The shaded areas 30 on the negative or lower region of the amplitude reference line correspond to the situation where two of the overlapping segments of sine wave values are negative during the time frame corresponding to the negative cycle of any of the three sine waves. Considering the positive cycle of sine wave 22, for instance, the shaded areas 28 represent the positive values corresponding to the overlapping segments of the wave 22 with the sine waves 26 and 24 respectively. Similarly, considering the negative cycle of sine wave 22, the shaded areas 30 represent the two negative values corresponding to the overlapping portions of sine wave 22 respectively with sine waves 26 and 24. It will be apparent that the positive shaded areas 28 and the negative shaded areas 30, in combination, correspond an Nth harmonic wave pattern for the particular instance where N is equal to three.

More specifically, these shaded areas correspond to a signal which can be applied as a gating signal to an inverter circuit, in accordance with conventional inverter firing techniques, to generate the desired third-harmonic wave patterns. The phase angle of this gating signal is easily adjustable relative to the line-frequency waveform and, accordingly, the phase angle of the resulting third-harmonic waveform at the inverter output can also be easily adjusted.

Figure 2B:
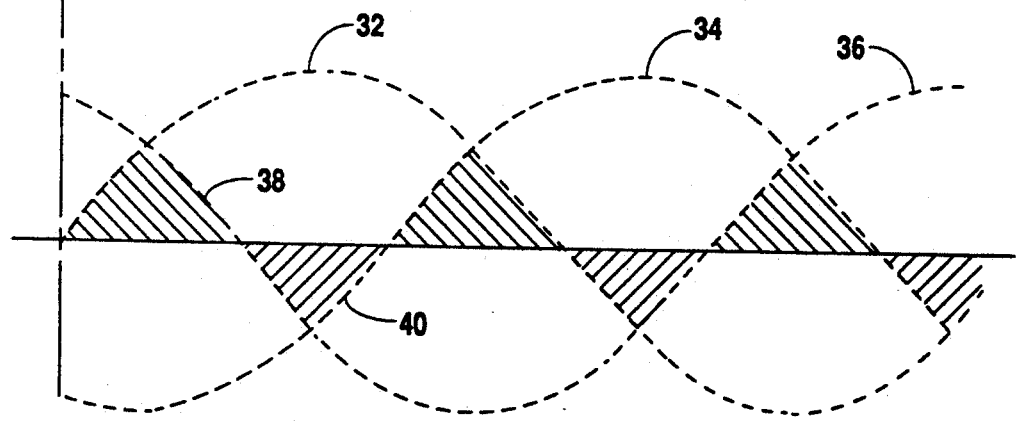

A different phase of the shaded Nth-harmonic wave form represented by FIG. 2A can be obtained by means of a set of line-frequency sine waves whose phase angle $\phi_1$ is shifted by a predefined number of electrical degrees from the original wave group. FIG. 2B shows such a group of phase-shifted line-frequency sine waves 32, 34, 36. The phase shift of the new wave form is inversely proportional to both the harmonic order and the phase order of the waves. In mathematical terms, the phase shift of the new phasor group relative to the phase of the sine waves in FIG. 2A is given by the equation:

$$\phi_1 = \frac{360°}{N \cdot M} \quad (2)$$

where N is again an odd integer representing the harmonic order and M is an integer representing the phase order of the waves. It should be noted that the shaded areas in FIG. 2B represent a third-order harmonic wave form having a phase order defined by M=3.

Figure 3:
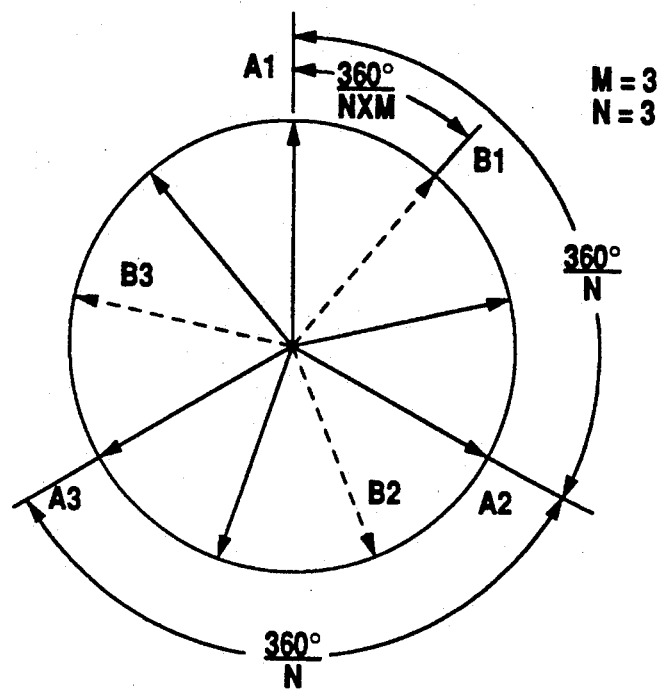
FIG. 3 is a graphical representation of line-frequency phasors used for producing third-harmonic, three phase gating signals.

Turning now to FIG. 3, there is shown a phasor diagram illustrating the relative phase-shift between sets of phasors corresponding to the line-frequency sine waves shown in FIGS. 2A and 2B. It will be obvious that for an M-phase harmonic source, the total number of phasor groups is equal to M.

Phasors A1, A2, and A3 respectively correspond to the line-frequency sine waves 22, 24 and 26 of FIG. 2A; these phasors are disposed at an equidistant phase angle represented by 360°/N. The phasors B1, B2, and B3 correspond to the line-frequency sine waves 32, 34, and 36 respectively of FIG. 2B. The phasors B1–B3 are also disposed at an equidistant phase angle of 360°/N relative to each other. However, these phasors are phase shifted by an angle 360°/(N.M) relative to corresponding phasors A1, A2, and A3.

Considering the case of third-order harmonics having a third order phase, i.e., where N=3 and M=3, the first phasor set A1–A3 has an equidistant phase angle of 360/3=120°. The second set of phasors B1–B3 is phase shifted by an angle of 360/(3.3)=40° relative to the first phasor set while having the same equidistant phase angle of 120°.

Figure 4:
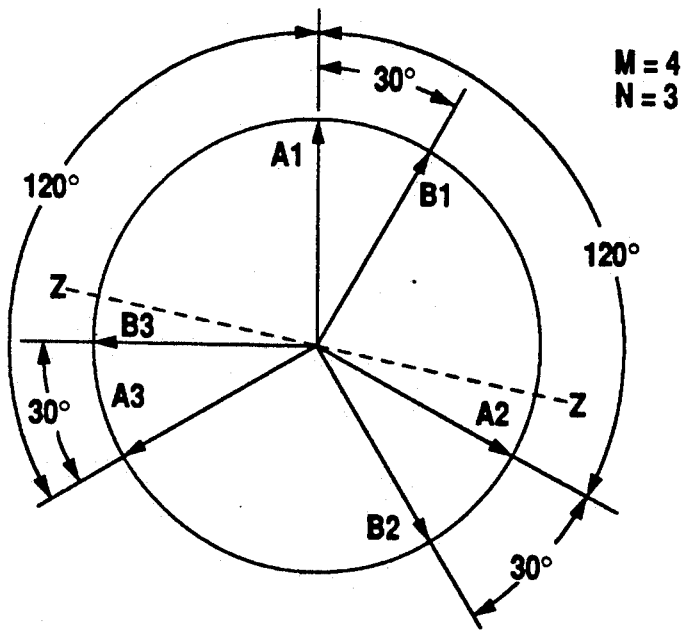
FIG. 4 is a graphical representation of line-frequency phasors used for producing third-harmonic, two-phase gating signals.

Referring now to FIG. 4, there is shown a phasor diagram for a set of three line-frequency phasors used for producing two-phase, third-harmonic phase switching signals. As shown therein, the first set of phasors A1, A2, and A3 are disposed at an equidistant angle of 360/3=120°. However, the second set of phasors B1, B2, and B3 are phase shifted by an angle of 360/(4.3)=30° relative to the original phasors while having the same equidistant phase angle of 120°. Since the phase displacement in the two-phase situation is 90°, a two-phase case can be considered to be a special instance of the four-phase case, and accordingly the angles between the phasors may be conveniently calculated by selecting M=4. The number of phasor groups is also equal to four with two of the groups being complementary to the other two. Therefore, only the two groups of phasors shown in FIG. 4 need be used. It will be apparent to those skilled in the art that the phasors illustrated in the phasor diagrams of FIGS. 3 and 4 can be constructed by the addition of the basic two- or three-phase vectors in proper proportions. The desired phasors are conveniently obtained, for instance, by connecting appropriate segments of the secondary windings of a center-tapped transformer. Alternative means, such as an appropriate R-L-C phase shifting network, may also by used to produce the phasors.

The use of the phasor diagrams described above and, in particular, the phase relationship between the phasors indicated therein, to generate the required line-frequency sine wave signals will now be described in detail in accordance with the two different signal generation schemes referred to earlier.

According to the rotating transformer scheme, phasor signals for generating an N-phase, Mth-order harmonic output from a fundamental wave are produced by positioning (N.M) coils per pole pair in the slots of either the stator or rotor of an AC machine at the electrical angular positions indicated by the phasor diagram shown at FIG. 3. To generate a three-phase, third-order harmonic wave, for instance, nine coils are positioned per pole pair at the positions indicated by the phasors. When the rotor or the stator opposite to these coils is energized with line-frequency power so as to produce a rotating field, the output voltage extracted from the coils represents the desired line-frequency signals having the phase relationship indicated by the corresponding phasors. Under these conditions, the phase angle of the extracted line-frequency signals with respect to the line voltage as a group can be conveniently adjusted by changing the relative position between the stator and the rotor.

Figure 5:
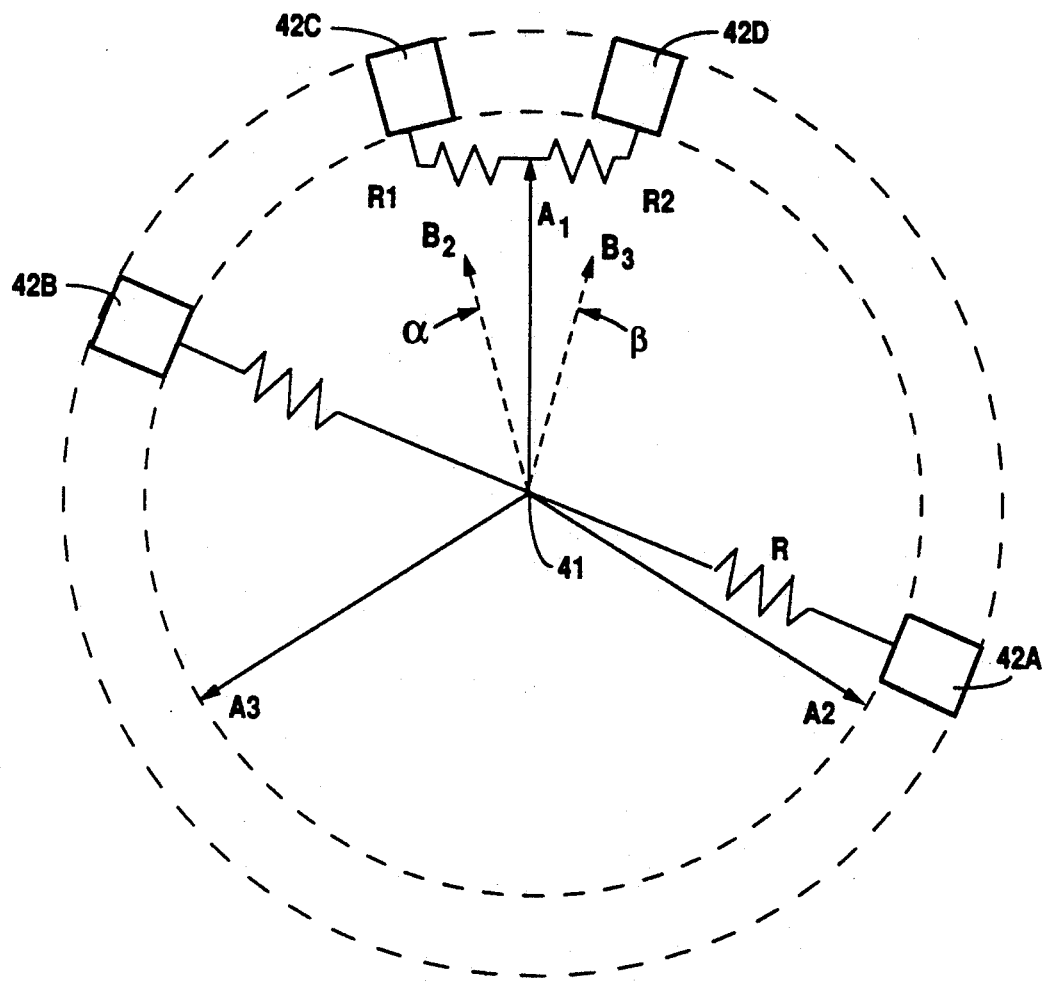
FIG. 5 is a graphical representation of line-frequency phasor signals tapped from commutator segments by using an artificial, neutral junction.

As an alternative, the required line-frequency signals can also be tapped from the commutator segments of an AC commutator-type machine, as illustrated in FIG. 5. According to this arrangement, the coils for the commutator machine are positioned at the electrical angular positions indicated by the phasors. In this case, an artificial neutral point 41 is defined between opposing commutator segments 42A and 42B as a central junction between two or more identical resistors R connected across the opposing segments. Under these conditions signals extracted from commutator segments corresponding to the positions indicated by the phasors will display a phase relationship corresponding to that of the phasors.

However, in the case of a commutator machine it is possible that the number of coils per pole pair may be inadequate for producing the exact phase relationship required between the phasor signals. Consider, for instance, the phasor B2 in FIG. 5 having a phase angle beta relative to the original phasor A1. In order to derive a signal corresponding to such a phasor B2, a potential divider comprising two resistors R1 and R2 connected between appropriate commutator segments (42C and 42D) is used. The resistance ratio R1/R2 of the potential divider corresponds closely to the angular ratio alpha/beta where alpha and beta are the phase shift angles corresponding to the phasors resulting from the use of the divider. Accordingly, the value of the resistors R1 and R2 can be selected in such as way as to generate phasors (such as B2 and B3 in FIG. 5) at the desired phase angle.

Figure 6:
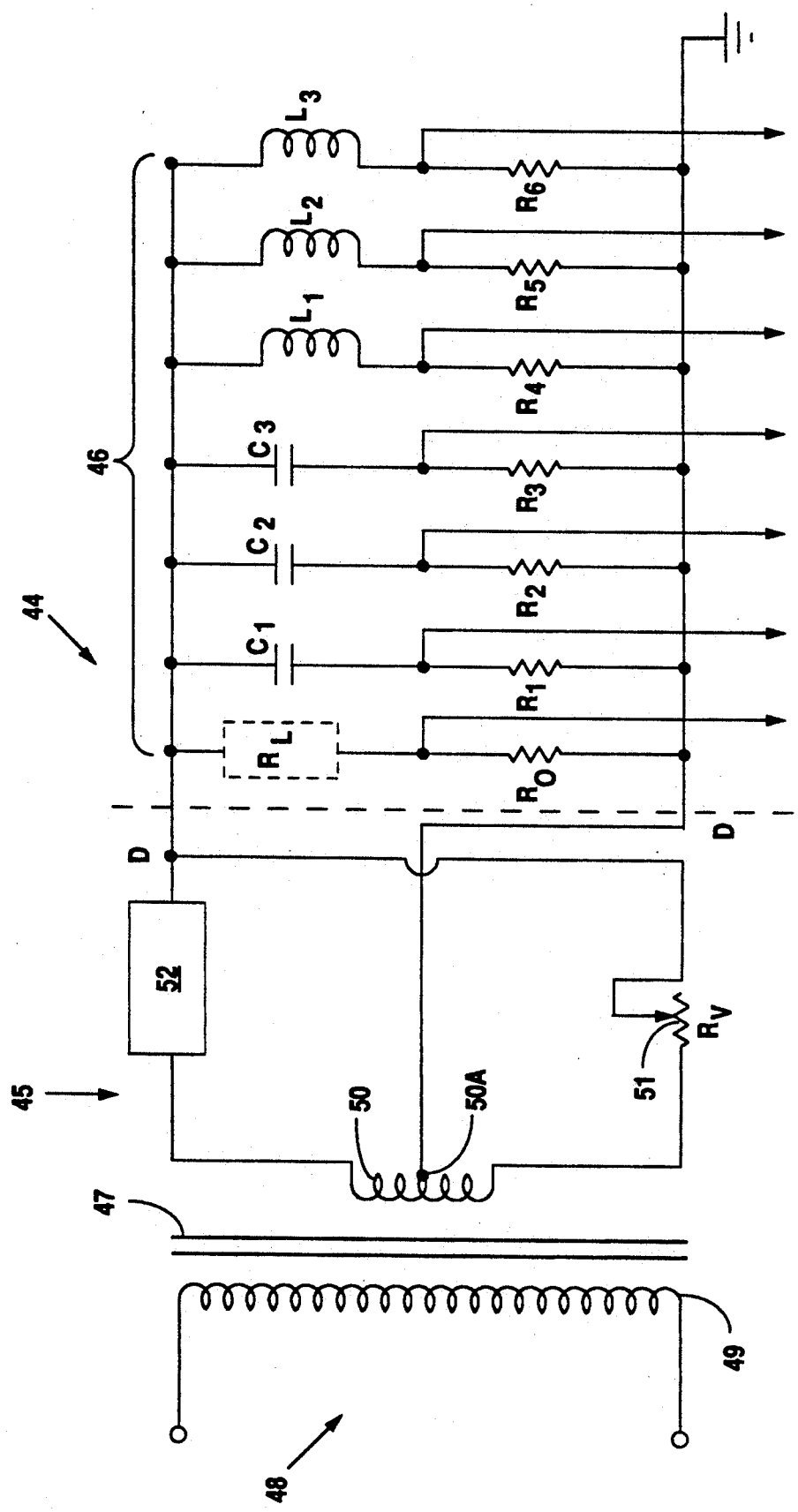
FIG. 6 is a schematic diagram of a preferred combination of an adjustable phase shifter and a R-L-C circuit according to this invention.

Turning now to FIG. 6, there is shown a schematic diagram of a preferred R-L-C network-based adjustable phase shifting arrangement for producing the desired line-frequency phasors. The arrangement 44 is essentially the combination of a master phase shifter comprising a transformer-based circuit 45 and a secondary phase shifter comprising an R-L-C circuit 46. The master phase shifter 45 includes a center-tapped transformer 47 adapted to accept the fundamental AC input 48 at its primary winding 49 to generate a transformed output at a secondary winding 50. The secondary winding 50 is linked at its ends to a variable resistor $R_V$ (reference numeral 51) and a phase-shifting component 52 comprising an inductor L or a capacitor C. The combination of the phase-shifting component 52 and the variable resistor $R_V$ provides the adjustability of the overall phase of the fundamental AC input generated at the secondary winding 50 of transformer 47. The transformed secondary output is extracted at a center-tap point 50A of the secondary winding 50 and is available at output points D-D from where it is fed to the R-L-C circuit 46.

The secondary phase shifter circuit 46 essentially comprises a series of R-C, R-L phase-shifting lines successively connected in parallel across the output terminals D-D. The phase-shifting components essentially function to generate the phasor signals corresponding to the set of fundamental frequency signals at the desired equidistant phase angle. In FIG. 6, for instances, a series connection of resistors $R_O$ and $R_L$ is connected across the output terminals D-D with the junction of the resistors serving as the point for extracting the transformed secondary output as a phasor signal A0 without any further relative phase shift. Similarly, phase-shifting lines respectively comprising series R-C connections of resistors $R_1$, $R_2$, $R_3$ and capacitors $C_1$, $C_2$ and $C_3$ are provided for extracting phasor signals A1, A2, and A3 respectively. Phase-shifting lines comprising series R-L connections formed respectively of resistors $R_4$, $R_5$, $R_6$ and inductors $L_1$, $L_2$, and $L_3$ are connected in parallel across the output terminals D-D for generating corresponding phasor signals A4, A5, and A6. It will be appreciated by those skilled in the art that phasor signals at the desired phase angles identified in the phasor diagram of FIG. 4 can be obtained by appropriately selecting the values of components in the different phase-shifting lines comprising the R-L-C circuit 46.

The above adjustable phase shift arrangement is advantageous in that the phase shift is induced directly in the line-frequency signals; accordingly, any phase shift at the fundamental frequency produces a phase shift that is multiplied at the harmonic frequency. In the case of third harmonic generation for example, the master shifter produces three times the adjustable phase shift then would be possible if the phase shifting were to be performed upon the harmonic signals.

It should, however, be noted that the maximum phase shifting provided by the R-L or R-C phase-shifting lines with respect to the fixed common point shown in FIG. 6 is 90°, either leading or lagging. In other words, the range of phase shift that can be achieved by the R-L-C circuit 46 is restricted to two quadrants. In order to effectively generate phasors spread over all four quadrants, as required for the phasors represented in FIG. 3, it is necessary to transpose phasors from the lower quadrants into the upper quadrants by turning these phasor by 180° at the phasor-generation stage. For example, the phasors shown as falling below the axis Z-Z (which defines the positive and negative quadrants) in FIG. 4 are transposed by turning them by a factor of 180° so that all required phasors are effectively confined in two quadrants. More specifically, the original phasors A2, A3, and the phase-shifted phasors B2, B3 are transposed by a factor of 180° and are represented as corresponding negative phasors in FIG. 7.

The transposed phasors can be obtained from the phase-shifting arrangement shown in FIG. 6 by the convenient use of an inverter prior to further processing of the line-frequency phasor signals generated by the R-L-C circuit. As an alternative, a phase-shifting circuit comprising exclusively of R-C lines can be used to produce a group of phasors which are confined in two quadrants. It is important that the transposed phasors be turned back to their original form at a subsequent stage in the signal processing scheme.

Figure 8:
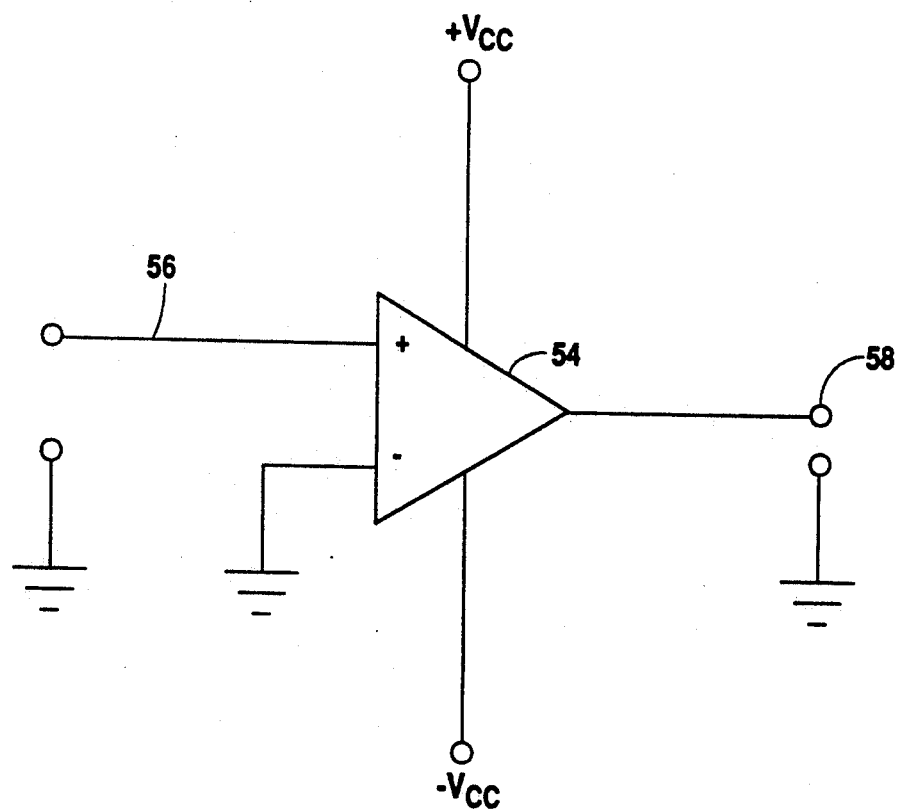
FIG. 8 is a schematic diagram of a preferred converter circuit for transforming sine wave signals into square waves adapted for use with the rotating transformer and the adjustable phase shifter schemes of this invention.

As discussed above, the voltage value around the zero-crossing points of the fundamental sine waves, and consequently the polarity of the sine waves, can be detected more accurately if the sine waves are first transformed to square waves having discrete steps at the zero-crossing points. A variety of circuits may be used for this purpose. FIG. 8 shows an exemplary circuit in which a comparator 54 which is energized by a supply voltage $\pm V_{CC}$ accepts the incoming sine waves 56 at its positive input and compares it to the reference ground potential at its negative input. The resulting output is a square wave 58 having discrete positive transition points at the zero-crossing points of the input sine wave. Because the comparator 54 operates as a magnitude detector, this arrangement provides an accurate output even if the input sine waves are slightly deformed as long as the zero-crossing points are accurately defined. Separate comparator arrangements of this type are used for each of the fundamental sine waves comprising the multi-phase fundamental input in order to generate corresponding discrete square waves.

Figure 9:
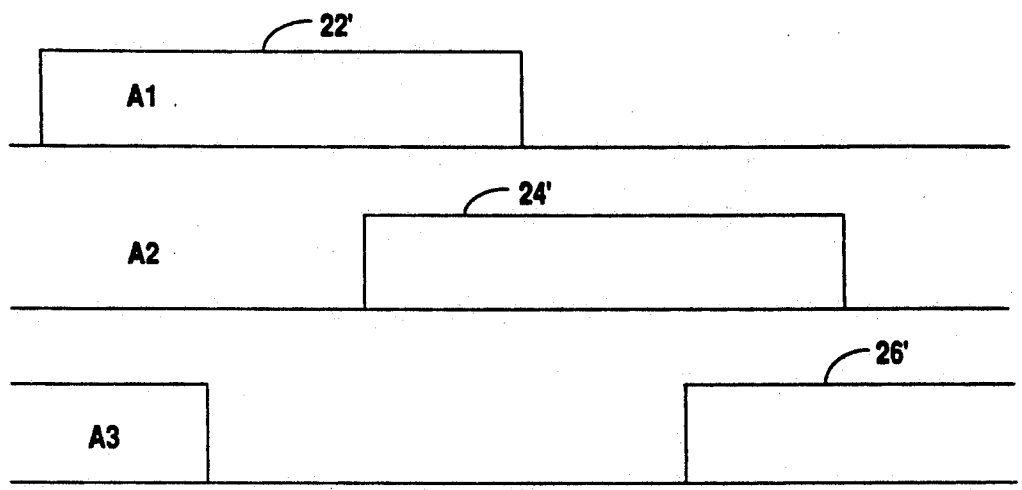
FIG. 9 is a graphical representation of the respective output wave form generated by the comparator circuit of FIG. 8 in correspondence to the sine waves of FIG. 2A.

The square waves 22', 24', and 26' generated by the comparator 54 in correspondence with the sine waves 22, 24, and 26 of FIG. 2A are shown at FIG. 9.

Figure 10:
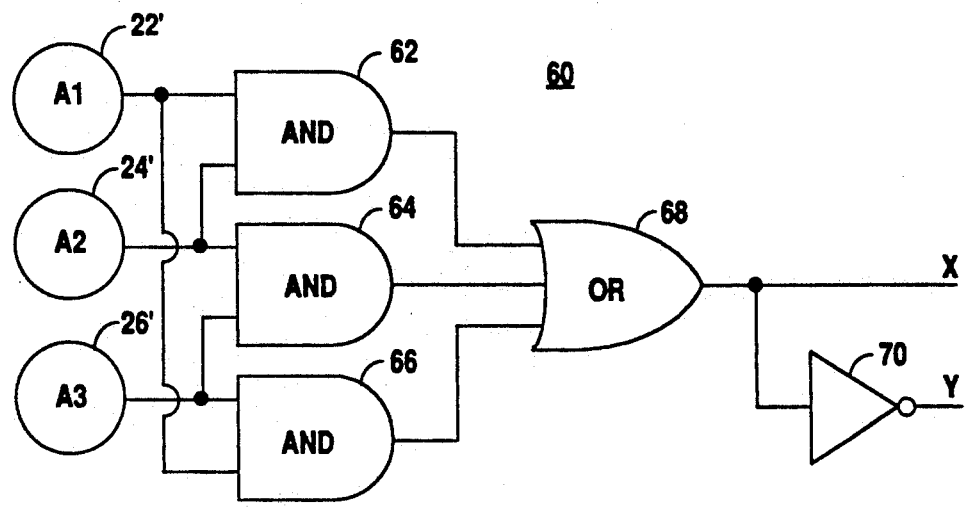
FIG. 10 is a schematic diagram of a preferred logic circuit for producing firing pulses and adapted for use with the rotating transformer and adjustable phase shifter schemes of this invention.

FIG. 10 shows a preferred logic arrangement 60 for detecting the polarities of the square waveforms generated in correspondence to the fundamental sine waveforms. As shown therein, separate AND gates are used to detect the pluralities of successive ones of the generated square waveforms at a given time. The detected signals from all such AND gates are used in combination to yield the gate timing signal corresponding to one phase of the desired harmonic order. More specifically, the square waves 22' and 24' are fed as inputs to an AND gate 62. The square waves 24' and 26' are fed as inputs to a second AND gate 64 and the square waves 26' and 22' are fed as inputs to a third AND gate 66. Each AND gate detects the pluralities of the two square waveforms at its inputs. When the pluralities are positive or above a predefined threshold level for both the input waveforms, a positive signal (i.e., a logical 1) is generated through the AND gates.

Figure 7:
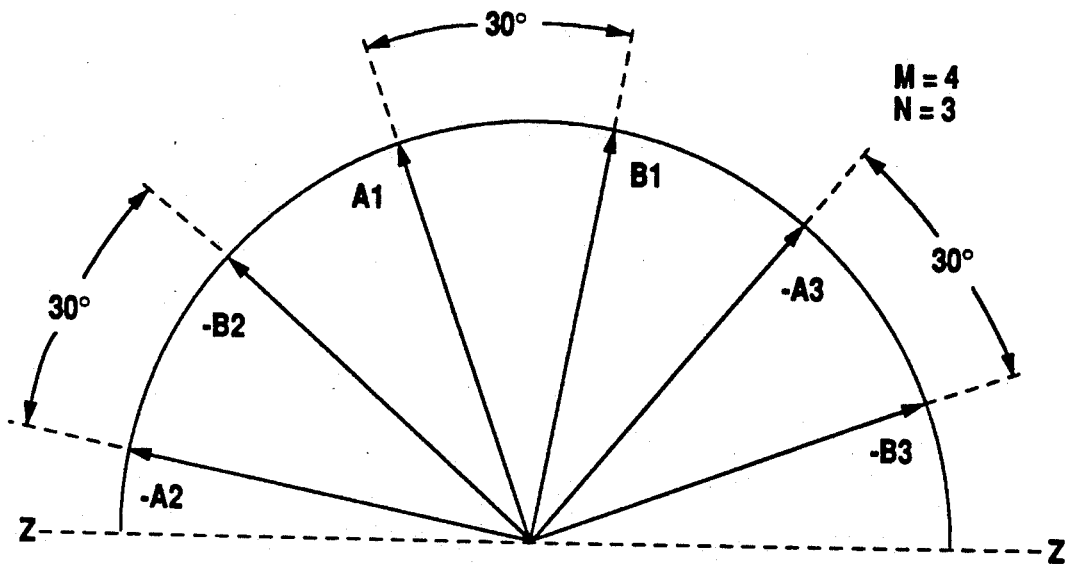
FIG. 7 is a graphical illustration of line-frequency phasors which are confined to two quadrants by phase inversion.

The output signals produced by the AND gates 62, 64, and 66 are fed as inputs to a multiple-input OR gate 68 which generates a positive output signal if any of its input signals corresponds to the detection of a positive plurality for the compared waveforms. The output of OR gate 68 represents a signal corresponding to the positive segment of the desired harmonic as represented by the positive shaded areas in FIG. 2A. Accordingly, the output signal of OR gate 68, in combination with an inverted form of the output extracted through an inverter 70, represents the final gate timing signal to be applied to one of the switches of an inverter or power-electronics generator circuit for generating one phase of the desired third-harmonic. In order to generate an M-phase third-harmonic, M different sets of the logic arrangement shown at FIG. 10 must be used. The inverter 70 can also be used for transposing the phasor signals (as represented in FIG. 7) by the required factor of 180°, if needed.

Figure 11:
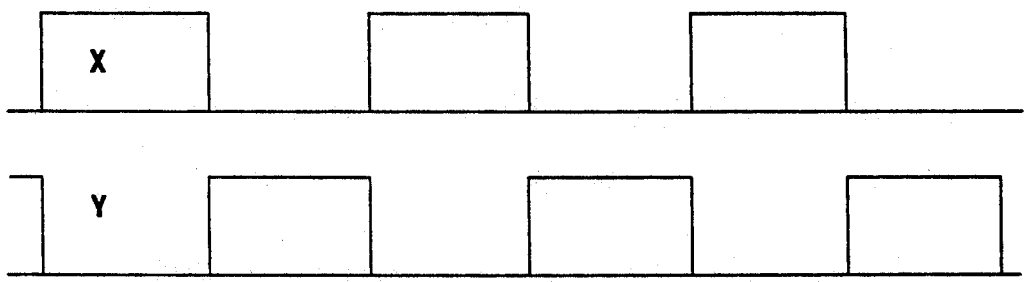
FIG. 11 is a graphical representation of the output waveform generated by the logic circuit of FIG. 10.

The wave form of the output generated by the OR gate 68 is shown at FIG. 11. This wave form is designated by the reference letter X and provides a positive transition each time the polarities of the two square wave forms (see FIG. 9) being compared are found to be positive. The output of the inverter 70 is represented by the wave form designated as Y and is the direct inverse of the wave form X. Comparing the waveform X with the shaded portions of common polarity shown for the fundamental line-frequency signals of FIG. 2A, it will be apparent that the logic arrangement of FIG. 10 produces an output signal directly corresponding to the positive segment of the desired harmonic of the fundamental wave and having the same relative phase angle. The inverted waveform Y similarly corresponds to the negative segment of the desired harmonic. Consequently, the two waveforms, in combination, can be used directly as timing signals for firing or gating the switches corresponding to one phase of a standard inverter or power-electronics generator. These timing signals correspond to the harmonic order represented by the plurality of fundamental line-frequency signals and similar gating signals need to be generated for each phase of the M-phase harmonic desired.

The following description will focus upon a "digital" method, according to the system of this invention, for producing the required M-phase, Nth-order harmonic gate timing signals or firing pulses for the solid-state switches of a standard inverter or power-electronics generator. It should be noted that in order to generate an M-phase, Nth-order harmonic, the total number of firing pulses required per fundamental line frequency cycle should be equal to (M.N). The pulses so generated should be equidistant on the time axis and should also be in synchronism with the reference signal ($F_r$) having the fundamental frequency ($F_1$). The frequency of the firing pulses should be (M.N) times the fundamental frequency i.e., (M.N). $F_1$ Hz. Another requirement is that the first pulse of the (M.N) pulses should be delayed by a predefined angle $\alpha$ (based on $F_1$) from the positive zero-crossing point of the reference signal.

Figure 12:
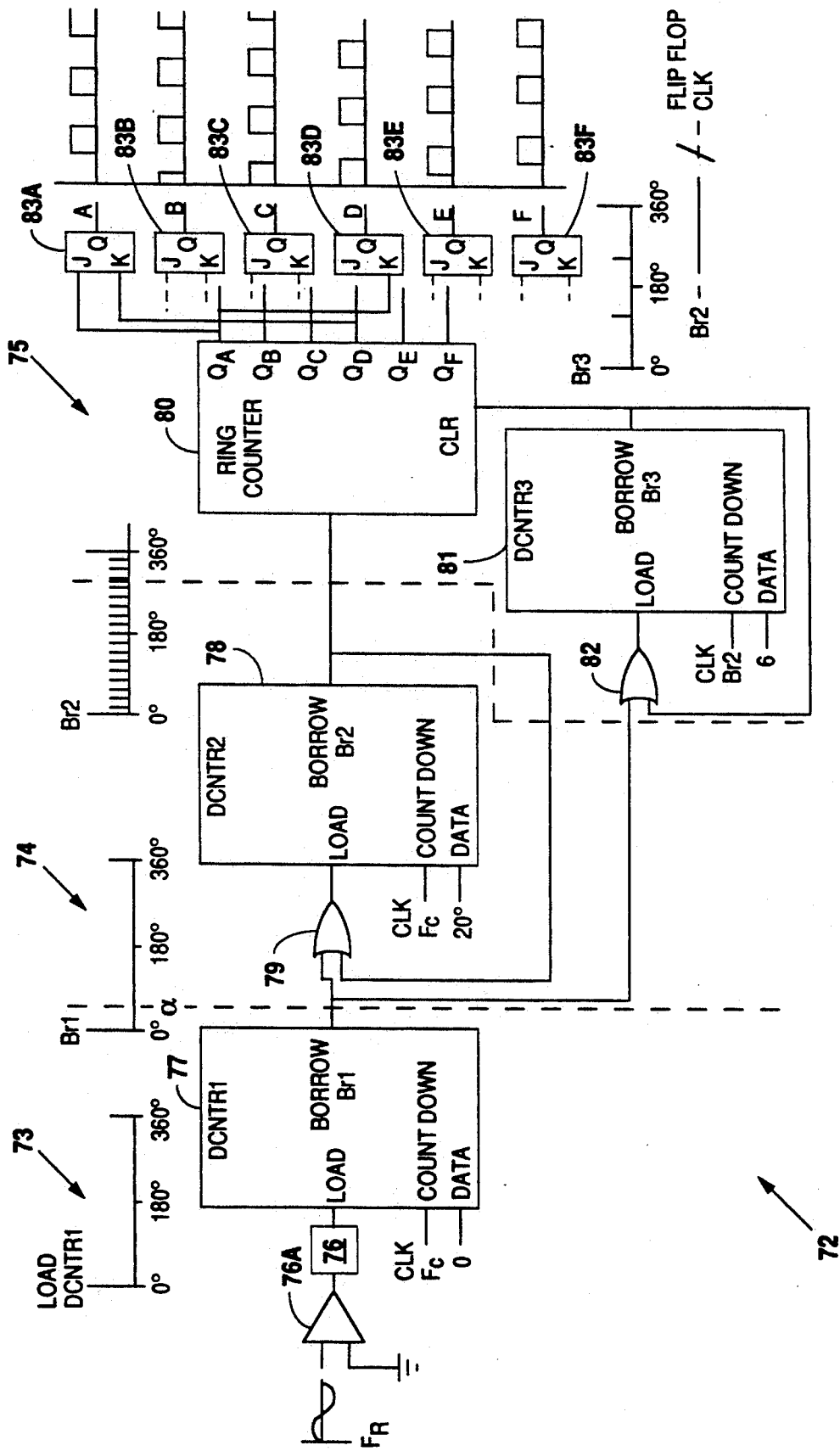
FIG. 12 is a schematic representation of a preferred logic circuit for use with the digital scheme according to this invention.

FIG. 12 shows a block diagram of a preferred digital circuit for generating the required firing pulses on the basis of the above criteria. The digital circuit 72 essentially comprises three main blocks, a firing angle block 73, a firing pulse generator block 74, and a firing pulse distributor block 75.

The firing angle block 73 functions to generate a single pulse every fundamental frequency cycle. This fundamental-frequency pulse is delayed by a predefined angle $\alpha$ from the positive zero-crossing point of the reference signal. As in the case of the line-frequency signal modification method discussed above in detail, the fundamental sine wave is first transformed into a corresponding square wave by using a comparator arrangement of the type shown in FIG. 8 so that the zero-crossing points and hence the plurality of the wave may be detected with increased accuracy.

The transformed fundamental wave is fed as an input to a positive edge trigger 76 adapted to generating an output pulse for each positive transition of the input wave form. The output of the trigger 76 is then fed to a logic down counter 77 which forms the main building element of the firing angle block 73. The main inputs to the counter 77 are the load input (L), the data input (D), and the count-down input (C). The counter 77 receives the timing clock pulses having a frequency $F_c$ at its count-down input. The frequency value $F_c$ is selected in such a way as to provide an acceptable firing angle resolution and firing pulses error estimate, as will be explained in detail below. The data that is input to counter 77 is the binary equivalent of a value $\alpha_{B1}$ which represents the firing angle and is defined by the mathematical relationship given below:

$$\alpha_{B2} = \frac{F_c}{360 \cdot F_1} \cdot \alpha \quad (3)$$

In order to reduce the complexity of the logic down counter 77, the calculated value for $\alpha_{B1}$ is rounded off to the nearest integer. The counter 77 is provided with a load command input at the beginning of every fundamental frequency cycle. This load command is generated by comparing, by means of a comparator 76A, the AC reference signal with the ground potential to generate a square wave output which is fed to the positive edge trigger 76. The output of the edge trigger 76 hence serves as the required load signal for counter 77. When the counter 77 receives the load command at the beginning of each fundamental frequency cycle, the data at its data input (i.e., the binary equivalent of $\alpha_{B1}$) is loaded into the counter. The counter then starts counting down on the basis of the clock frequency ($F_c$) pulses provided at the count-down input. After the passage of $\alpha_{B1}$ pulses, a borrow signal BR1 appears on the borrow line of the counter 77. This output of the counter is a pulse that appears every 360° and is delayed by an angle $\alpha$ from the positive zero-crossing of the reference signal.

The borrow signal output BR1 of counter 77 is subsequently relayed to the firing pulse generator block 74 which generates the required number of equidistant pulses every $F_1$ cycle. Considering the case where a three-phase, third-order harmonic is desired, the total number of pulses required per fundamental line-frequency cycle is 18 and the generator block 74 is adapted to generate 18 equidistant pulses every $F_1$ cycle. By using 18 pulses over the complete 360° cycle, using $F_1$ as a reference, a single pulse is generated every 20°. The main building element in the generator block 74 is a logic down counter 78 which uses the borrow signal produced by counter 77 as its load signal pursuant to the signal being processed through an OR gate 79. The same fundamental clock frequency $F_c$ used as the count-down signal for counter 77 is also used as the count-down signal for counter 78. Accordingly, counter 78 is initialized at every cycle corresponding to $F_1$ and this limits the error accumulation in the generated pulses. The input data for counter 78 is the binary equivalent of $\alpha_{B2}$ which represents the distance between any two successive pulses and is based on the mathematical relationship given below:

$$\alpha_{B2} = \frac{F_c}{360 \cdot F_1} \cdot 20 \qquad (4)$$

Again, the value of $\alpha_{B2}$ is rounded to the nearest integer in order to reduce the complexity of the logic down counter 78. Once the load input of counter 78 has been energized by the borrow signal BR1 from counter 77, a borrow signal BR2 is generated at the borrow line or output of counter 78 after the passage of $\alpha_{B2}$ pulses. In order to generate the desired train of 18 pulses, the borrow signal BR2 is fed back through the OR gate 79 so as to reload counter 78. The pulse train so generated is re-initialized by the borrow signal BR1 every 18 pulses, i.e., every 360° relative to the $F_1$ frequency. It is important that the value of $\alpha_{B2}$ be selected to be equal to or greater than the value defined by equation (4) in order to ensure that the feedback of the borrow signal BR2 in counter 78 does not generate an additional pulse instead of the required exact number of 18 pulses.

The borrow signal BR2 representing the pulse train generated by counter 78 is relayed to the firing pulse distributor block 75 which distributes the pulses among the solid-state switches of the harmonic generator circuit being used. In case of the three-phase, third-harmonic generation being discussed as an example, the 18 pulses constituting the BR2 signal are distributed among six corresponding solid-state switches of a standard three-phase, third-harmonic generator power-electronics circuit (not shown). In order to provide the required pulse distribution, a ring counter 80 receives the pulse train along with a signal identifying, for the counter, the particular pulse which marks the beginning of every third-harmonic cycle. By using this identification signal, the counter can correctly distribute the train of pulses among its six outputs $Q_A$, $Q_B$, $Q_C$, $Q_D$, $Q_E$, and $Q_F$ by initiating every new round of distribution with the first output pulse being sent to the first output of the counter i.e., $Q_A$. The identification signal is received at the clear input of counter 80 and effectively re-initializes the counter.

In order to generate the identification signal, a logic down counter 81 is provided. The counter 81 uses the 18 pulses provided per $F_1$ cycle by the output signal BR2 of counter 78 as its count-down input. The counter is loaded with the output signal BR1 of counter 77 through an OR gate 82 while its data input is provided with the binary equivalent of the number of outputs (in this case six) of the ring counter 80. Accordingly, the counter 81 generates a borrow signal BR3 every six pulses i.e., at the beginning of every third-harmonic cycle. The output signal BR3 of counter 81 is used as the clear signal for the ring counter 80. The signal BR3 is also fed back through the OR gate 82 in order to reload the counter 81 so as to generate the required train of clear pulses for ring counter 80. FIG. 12 also shows the corresponding output wave forms generated at the six outputs of ring counter 80. These outputs are uni-directional square waves at the third-harmonic frequency $F_3$.

In order to generate the required third-harmonic wave output, the output signals at every third of the ring counter output points are fed to a set of switches corresponding to a single phase in the power-electronic generator being used for harmonic generation. The number of sets of switches required corresponds to the phase order of the desired harmonic. For the 3-phase case selected as an example, three such sets are needed and are fed by the six output signals at the output points $Q_A$–$Q_D$. More specifically, the output signals at $Q_A$ and $Q_D$ are fed to a first set of two series solid-state switches (not shown) corresponding to phase one. Similarly, the outputs at $Q_B$ and $Q_E$ are fed to a second set of two series solid-state switches corresponding to phase two, and finally the outputs at $Q_C$ and $Q_F$ are fed to a third set of two series switches corresponding to phase three.

With the above arrangement, it is important that the high signal states in waveforms that are fed to the same pair of series switches (for example, the outputs of $Q_A$ and $Q_D$) do not overlap in order to prevent the occurrence of a short circuit. Although such an overlap is unlikely to occur with the use of a ring counter for the distribution operation, an added degree of safety can be incorporated into the digital circuit by the use of a series of flip-flops which are set and reset in such a way as to avoid any overlap of high states. In the logic circuit of FIG. 12, for instance, each of the ring counter outputs $Q_A$–$Q_F$ is fed to a corresponding one of a series of J-K flip-flops 83A–83F. The arrangement is such that the flip-flop 83A corresponding to the ring counter output $Q_A$ is set by $Q_A$ and reset by $Q_D$ while flip-flop 83D corresponding to output $Q_D$ is set by $Q_D$ and reset by $Q_A$. This reciprocal set/reset connection ensures that no overlap occurs between the ON signals which are fed as a gating signal to a set of series switches, such as the signals derived at $Q_A$ and $Q_D$. Similar connections are used with the remaining two pairs of flip-flops. The firing signals extracted from the J-K flip-flops are supplied to the solid-state switches of the harmonic generation scheme through proper isolation means.

Figure 13:
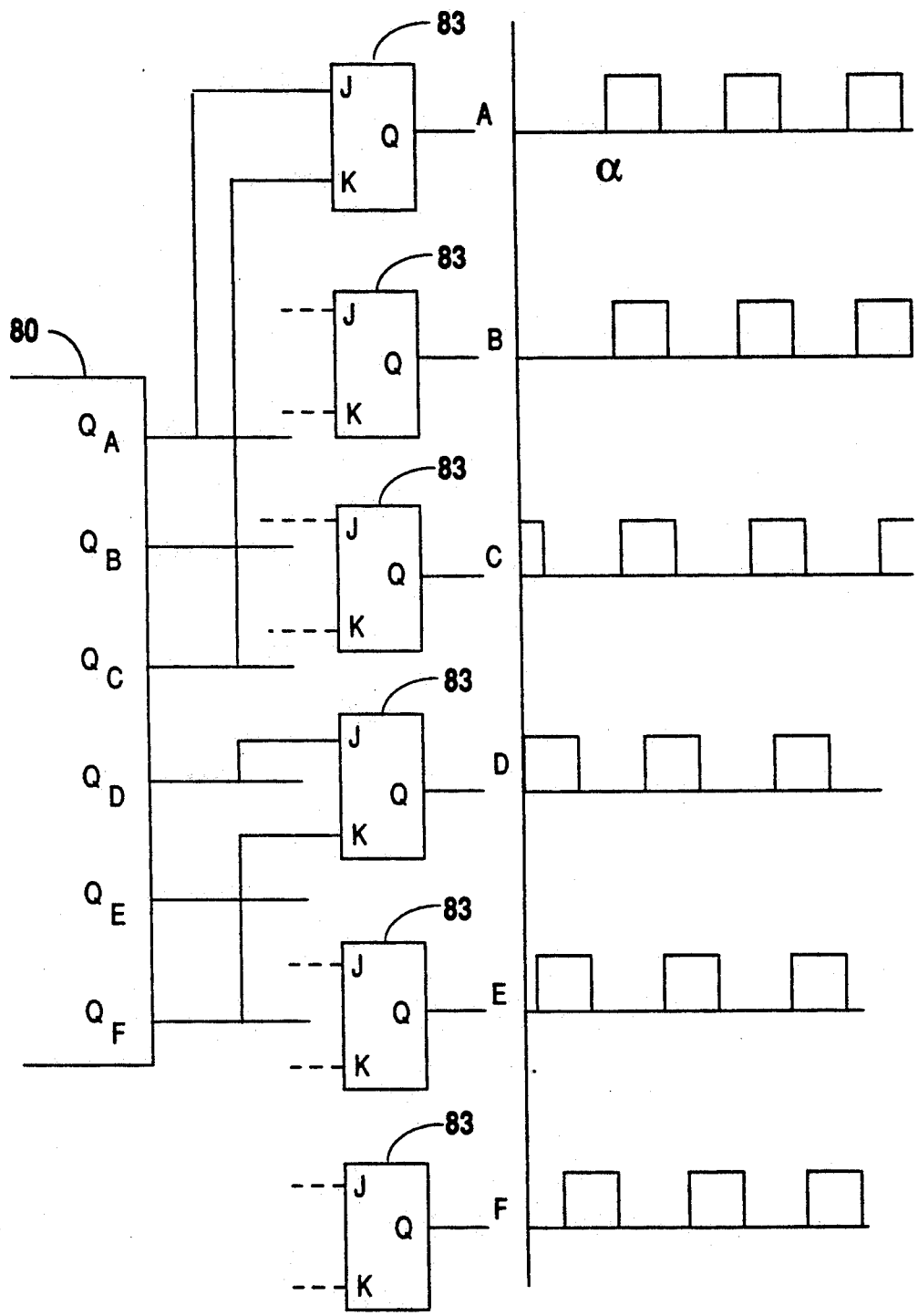
FIG. 13 is a schematic representation of a modified distributor block for generating firing pulses and adapted for use with the digital circuit of FIG. 10.

Referring now the FIG. 13, there is shown a modified connection scheme for the flip-flops which is adapted to adjusting the output signals generated by the ring counter 80 in the firing pulse distributor block 75 of FIG. 12 in such a way as to modify the ON time of the solid-state switches of the harmonic generator being used. According to the arrangement of FIG. 13, the flip-flop 83A corresponding to the output $Q_A$ of ring counter 80 is set by $Q_A$ as in the case of the wiring arrangement of FIG. 12. However, in this case, flip-flop 83A is reset by the output $Q_C$. The effect is that the output of flip-flop 83A commands the corresponding solid-state switch in the harmonic generator to be ON for only 120° instead of the ON time of 180° produced by the arrangement of FIG. 12. The remaining pairs of flip-flops are also connected in a similar manner so as to similarly effect the ON time of the other switches.

The logic arrangement described above for generating the firing pulses can be easily modified to generate any desired set of M-phase, Nth odd-harmonic gate timing signals for the harmonic generator circuit. In performing such an adaptation, the firing pulse distributor block arrangement must also be changed on the basis of the number of solid-state switches required to generate the desired harmonic. In the case of a two-phase, third-harmonic generation scheme, for example, only 12 pulses are required per $F_1$ cycle instead of the 18 pulses required for generating three-phase, third-order harmonics. The adjusted value of $\alpha_{B2}$ that is loaded into the logic down counter 78 is thus defined by:

$$\alpha_{B2} = \frac{F_c}{360 \cdot F_1} \cdot 30 \qquad (5)$$

It is also required that the ring counter 80 in the distributor block 75 be modified to distribute the train of pulses among the four solid-state switches (instead of six) required in this case; this is because only two sets of gating signals are needed for firing the two sets of switches required to generate a two-phase harmonic.

Figure 14:
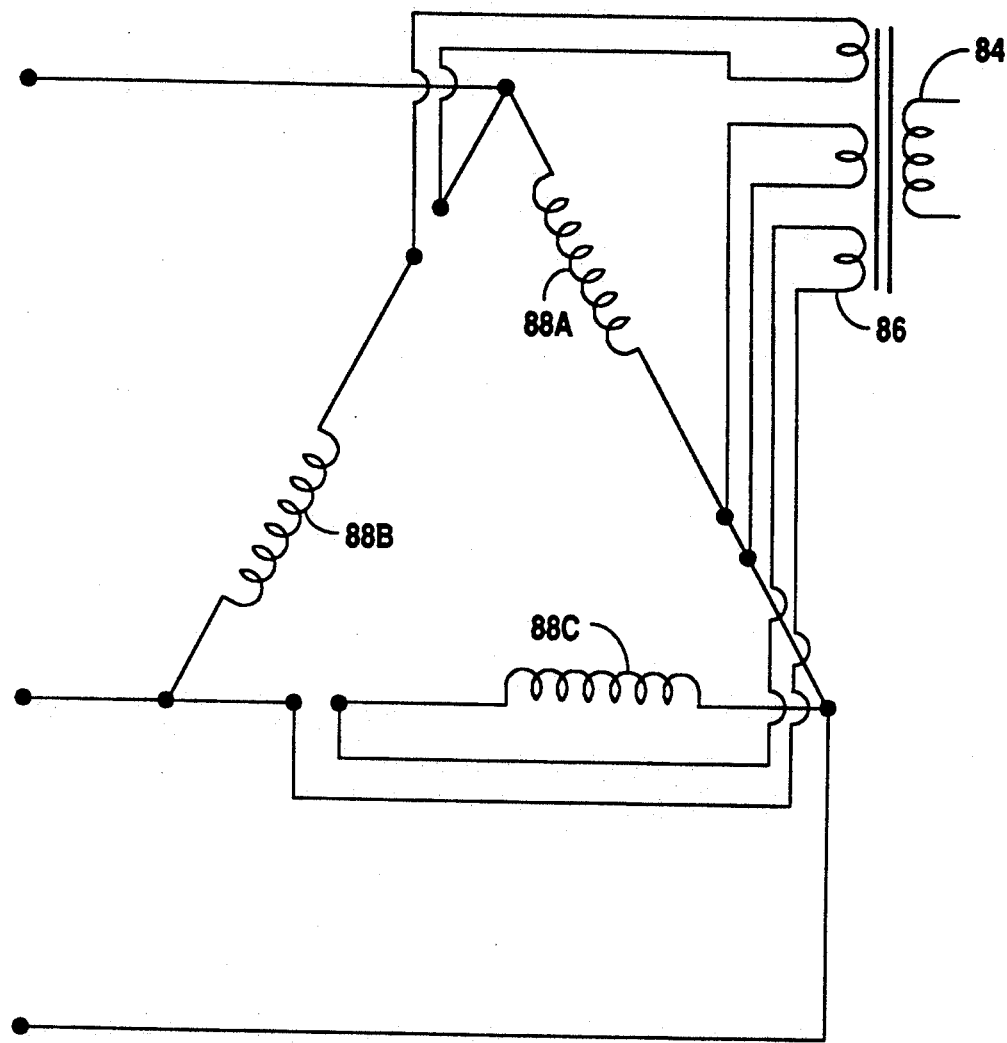
FIG. 14 is a schematic diagram illustrating a two-winding arrangement for use with the harmonic-generation scheme of this invention.

It should be noted that the arrangements discussed above can also be operated efficiently in applications where the excitation input is single phased. In such a case, the single-phase adjustable excitation input is applied through multiple secondary windings to an appropriately connected single stator winding from which the required multi-phase fundamental excitation can be extracted. FIG. 14 shows such an arrangement for third-harmonic generation in which the single-phase excitation is applied to a primary winding 84. The transformed output is derived from multiple secondary windings 86 (three windings shown in FIG. 14) and applied to delta-connected segments 88A, 88B, and 88C of a single stator winding 90. The output signals extracted from the segments of the stator winding constitute the 3-phase fundamental voltage to be subsequently processed for generating the harmonic gating signals.

Accordingly, two separate windings having different number of poles can be used by feeding the adjustable AC excitation input to a multiple-pole winding corresponding to the desired harmonic order. If a poly-phase excitation input is used, a poly-phase winding of the desired harmonic order is required. The harmonic generation scheme of this invention is thus adapted for use with both single-phase and two-phase AC machines.

We claim:

1. A method for generating multi-phase, multiple harmonic order signals of a fundamental frequency signal, said signals having a phase order M and a harmonic order N, said method comprising the steps of:
   generating M sets of line-frequency signals, each of said M sets consisting of N line-frequency signals, said line-frequency signals being centered about a reference level and disposed at a predefined equidistant phase angle relative to each other,
   said phase angle being adjustable relative to the phase of the fundamental frequency signal so as to provide a different predetermined equidistant phase angle for each of said M sets of line-frequency signals,
   detecting, for each set of line-frequency signals, the points at which each of said line-frequency signals crosses said reference level,
   using said detected reference level crossing points to generate, for each set of line-frequency signals, a gating signal representing the conditions of common polarity for successive ones of said line-frequency signals in the set, and
   using, in combination, said gating signals generated in correspondence to said M sets of line-frequency signals as gate timing signals for generating corresponding phases of the desired signals harmonic.

2. The method according to claim 1 wherein the sets of line-frequency signals are generated by:
   energizing coils positioned at predetermined angular positions in the stator or rotor of an AC electric machine, and
   extracting the line-frequency signals from coils positioned opposite each other on said rotor or stator.

3. The method according to claim 2 wherein said signals have a phase angle corresponding to the predetermined angular positions of said coils, and
   the phase angle of extracted signals is adjusted by changing the relative position between the stator and the rotor.

4. The method according to claim 1 wherein the sets of line-frequency signals are extracted from selected commutator segments of an AC commutator-type machine,
   said segments being disposed at predetermined angular positions in the machine for producing the desired phase angle between said line-frequency signals,
   said signals being extracted relative to a neutral point defined between oppositely positioned commutator segments.

5. The method according to claim 4 wherein certain sets of said line-frequency signals are extracted through a potential divider arrangement comprising a pair of serially connected resistors connected between two selected commutator segments,
   said commutator segments and said resistors being selected in such a way as to provide the desired phase angle between the line-frequency signals.

6. The method according to claim 1 wherein said sets of line-frequency signals are generated by first processing the fundamental frequency signal through a transformer-based adjustable phase-shifter, and
   subsequently processing the transformed output signals of said phase shifter through an R-L-C network including a plurality of phase-shifting lines corresponding to the desired line-frequency signals, each phase-shifting line providing a predetermined amount of shift in the relative phase angle of the output signals passing through said phase-shifting line.

7. Apparatus for generating gating signals for firing the switches of an inverter circuit or like power-electronics generator to generate harmonics of a fundamental line-frequency signal which have desired phase and harmonic order, said apparatus comprising:
   signal generator means for deriving a set of line-frequency sine wave signals at an equidistant, but adjustable phase angle, from said fundamental line-frequency signal,
   timing signal generator means for detecting the zero-crossing points of said sine wave signals and generating line-frequency phase-switching signals therefrom, and
   signal distributor means for distributing said phase-switching signals to said inverter switches for generating said harmonics therefrom.

8. The generating apparatus according to claim 7 wherein said signal generator means includes an A.C. machine having circularly disposed stator coils which are energized with said line-frequency signal to produce a rotating electric field therefrom, and said line-frequency signals are derived from oppositely positioned stator coils, the phase angle of said signals corresponding to the relative circular displacement of said stator coils.

9. The generating apparatus according to claim 7 wherein said signal generator means includes a master phase shifter comprising a center-tapped transformer circuit for transforming the overall phase angle of said fundamental line-frequency signal and a secondary phase shifter for generating said line-frequency signals with adjustable phase angle, said secondary shifter comprising a series of R-C, R-L phase-shifting lines connected in parallel across the output of said master phase shifter.

10. The generating apparatus of claim 7 wherein said signal generator means includes a first binary counter means for accepting said fundamental line-frequency signals and generating therefrom said phase-switching signals as a pulse train comprising a predetermined number of equidistant pulses corresponding to the phase angle and harmonic order of said desired harmonics, and a second binary counter means for generating a phase-delayed signal for adjusting the phase angle of said phase-switching signals with respect to said fundamental line-frequency signal, said train of pulses generated by said first counter means being locked to said phase-delayed signal generated by said second counter means.

* * * * *